United States Patent [19]

Kawamura

[11] Patent Number: 4,982,077
[45] Date of Patent: Jan. 1, 1991

[54] RECORDING FORMAT FOR OPTICAL RECORDING MEDIUM

[75] Inventor: Takayuki Kawamura, Tokyo, Japan

[73] Assignee: CSK Corporation, Tokyo, Japan

[21] Appl. No.: 481,732

[22] Filed: Feb. 14, 1990

Related U.S. Application Data

[63] Continuation of Ser. No. 61,215, Jun. 12, 1987, abandoned.

[30] Foreign Application Priority Data

Jun. 13, 1986 [JP] Japan ................... 61-138729

[51] Int. Cl.$^5$ .................. G06K 19/06; G11B 7/007
[52] U.S. Cl. .................. 235/494; 235/487; 369/59; 369/275.3
[58] Field of Search ............. 235/487, 494, 488, 454, 235/456; 369/275.3, 54, 58, 47, 59; 365/234; 358/342

[56] References Cited

U.S. PATENT DOCUMENTS

| | | | |
|---|---|---|---|
| 3,654,624 | 4/1972 | Becker et al. | 365/234 |
| 4,094,010 | 6/1978 | Pepperl et al. | 369/47 |
| 4,094,013 | 6/1978 | Hill et al. | 365/234 |
| 4,142,209 | 2/1979 | Hedlund et al. | 358/342 |
| 4,229,808 | 10/1980 | Hui | 365/234 |
| 4,347,527 | 8/1982 | Lainez | 358/342 |
| 4,494,226 | 1/1985 | Hazel et al. | 369/58 |
| 4,523,304 | 6/1985 | Satoh et al. | 358/342 |
| 4,562,577 | 12/1985 | Glover et al. | 369/58 |
| 4,634,850 | 1/1987 | Pierce et al. | 235/487 |
| 4,652,730 | 3/1987 | Marshall | 369/47 |
| 4,680,460 | 7/1987 | Drexler | 235/454 |
| 4,811,321 | 3/1989 | Enari et al. | 369/59 |

FOREIGN PATENT DOCUMENTS

| | | |
|---|---|---|
| 0210528 | 7/1986 | European Pat. Off. . |
| 61-82286 | 4/1986 | Japan . |
| 61-94189 | 5/1986 | Japan ................... 235/487 |

OTHER PUBLICATIONS

Patent Abstracts of Japan, vol. 11, No. 93, p. 3P559.

*Primary Examiner*—Stuart S. Levy
*Assistant Examiner*—Robert Weinhardt
*Attorney, Agent, or Firm*—Lowe, Price, LeBlanc, Becker & Shur

[57] ABSTRACT

A recording format for an optical recording medium having a rectangular data recording region capable of containing n data-bit lines. In the recording format, the data recording region is sectioned into bands having a width corresponding to an appropriate number of data-bit lines to form blocks. Each of the blocks is provided with an identifier to allow the access by block units. Each of the blocks may be formed of a group of data-bit lines and check bit line. Each block may have a plurality of sectors. The blocks may be sectioned by boundary information lines having a specific code pattern.

4 Claims, 2 Drawing Sheets

RECORDING FORMAT FOR OPTICAL RECORDING MEDIUM

This application is a continuation application of application Ser. No. 07/061,215, filed June 12, 1987 now Abandoned.

FIELD OF THE INVENTION

This invention relates to a recording format for an optical recording medium, which has a rectangular data recording region adapted to include n data-bit lines therein.

BACKGROUND OF THE INVENTION

Recently, card-type optical recording media have been put into the limelight, because of their portability and large storage capacity.

Among optical recording media, optical discs such as compact discs for an audio use or laser discs for a visual use have already been developed and reduced to practical use. However, card-type optical recording media have not yet been put into practice.

The recording format for the card-type optical recording media may be such that n data-bit lines are provided in a rectangular data recording region for forming n data tracks. More particularly, each of the data tracks has a width of one bit and arranged in a line, and a plurality of data tracks are juxtaposed, in parallel, over the data recording region.

However, the recording format as described above is disadvantageous in that the length of one track is restricted and the information amount containable in one track is small, due to the shape of the card-type optical recording media. Therefore, it would need more than one tracks to record data longer than one track storage capacity.

In this connection, it is to be noted that, according to the format as described above, the access operation for reading or writing should be carried out for every track. Therefore, a time required for finding a target track, namely a seek time, would be a total time required for seeking all the tracks to be subjected to access operation.

It is further to be noted that since data is recorded at a high density in the recording medium of this type, it is desirable to provide an error checking means in the format to improve the reliability of data to be read and/or written. However, since the format as referred to above has a limitation in a track length, it can only have a simple error detecting means and can not impart sufficient reliability to the error correction.

The present invention has been made to obviate the problems involved in the recording format for the optical recording media as described above, and it is an object of the present invention to provide a recording format for an optical recording medium, which is capable of increasing the information amount to be read or written by one access to curtail a seek time and which is further capable of arranging data two-dimensionally, so that plural-system error checking means may be provided, enhancing the data error checking function and ensuring the reliability of the recording format.

SUMMARY OF THE INVENTION

The present invention features a recording format for an optical recording medium having a rectangular data recording region capable of containing n data-bit lines, which recording format comprises blocks formed in bands having a width corresponding to an appropriate number of data-bit lines, by dividing or sectioning the data recording region, and identifiers allotted to the respective blocks for enabling access by block units.

The setting of the blocks can be effected simply by determining the width of the block by the number of the data-bit lines, but it may preferably be effected by dividing or sectioning the data recording region by providing a boundary information line or lines having a predetermined code pattern.

The code pattern for the boundary information line may be (0, 0, . . .) or (1, 1, . . .), or the code pattern may alternatingly be (0, 1, 0, 1, . . .) and (1, 0, 1, 0,).

The width of the block may be selected, as desired, by selecting the number of the data-bit lines, but it may preferably be formed of data bits and at least one check bit. Each of the blocks may be divided or sectioned, in the length thereof, to form a plurality of sectors.

In the present invention, one or more error check portions, each having a check code, may be provided, across the block in the width direction thereof, at an appropriate portion or portions in the longitudinal direction of the block. When the block is sectioned into plural sectors, the error check portions may preferably be provided for the respective sectors.

In the format configuration as described above, the sector number portion, the data portion and the error check portion may be provided in each of the sectors in this order. Thus, in each of the blocks, these sectors are arranged after the block number portion. In this case, boundary portions may preferably be provided between the respective sectors to section each two adjacent sectors.

OPERATION

According to the present invention, the data recording region is divided into a plurality of bands each having a width corresponding to several data-bit lines to form blocks and identifiers are allotted to the respective blocks for enabling the access by block units. As a result of this, data can be stored by block units and the storage capacity for one access can be increased, irrespective of limitation in length of the data bit line. Furthermore, as the access can be made by block units, a number of times for the access can be reduced to curtail a seek time as compared with the conventional format which needs access operations for every track for the reading or writing of the data.

Moreover, since each of the blocks comprises a plurality of data-bit lines and the data can be arranged two-dimmensionally, data error checking bits can be provided in two directions, namely, both in the width direction and the longitudinal direction.

Thus, the present invention enables the information amount to be read or written upon one access can be increased, reducing the seek time, and the data can be arranged in a two-dimensional manner to allow the application of plural-system checking means, ensuring data error checking and enhancing the reliability of the data.

PREFERRED EMBODIMENT OF THE INVENTION

Figure 1:
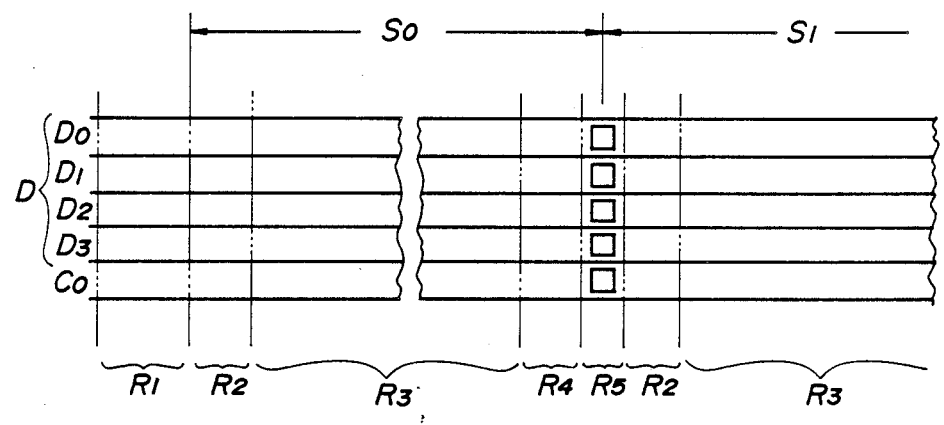
FIG. 1 is an explanatory view showing a configuration of a recording format for an optical recording medium according to a first embodiment of the present invention.

Preferred embodiments of the present invention will now be described, referring to the drawings.

First Embodiment

Figure 2:
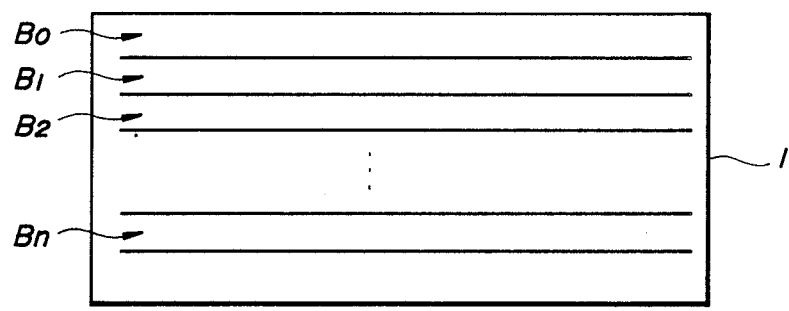
FIG. 2 is a plan view of an optical recording medium to which the recording format of the present invention may be applied.

FIG. 1 illustrates a recording format for an optical recording medium embodying the present invention. FIG. 2 is a plan view of an optical recording medium to which the recording format of the present invention is applicable. FIG. 2 shows, in an enlarged scale, a part of one block in the optical recording medium as illustrated in FIG. 2. In this connection, it is to be noted that rule marks indicative of the format of the block, are given in the figures, only for the convenience of explanation, and such rule marks are not needed for the actual recording medium. However, lines corresponding to the rule marks may be provided as reference lines for tracking.

As described above, the recording format of the present embodiment is applied to the card-type optical recording medium 1 as illustrated in FIG. 2. More specifically, the optical recording medium 1 has n blocks B0 to Bn juxtaposed in parallel with each other, on a data recording region of the optical recording medium, at predetermined intervals so as to each extend in the longitudinal direction of the region. Each of the blocks B0 to Bn has a width corresponding to a selected number of data-bit lines or a width corresponding to said selected number of bits. In the present embodiment, each of the blocks B0 to Bn has a equal bit-width.

In the embodiment as illustrated in FIG. 1, the blocks B0 to Bn each have a width of five bits (corresponding to five data-bit lines). In other words, the blocks B0 to Bn are set in such a manner that a number of data-bit lines extending longitudinally, which are juxtaposed in parallel with each other on the data recording region 2, are grouped by fives to form blocks.

Each block of five data-bit lines comprises a group D of data-bit lines D0 to D3 and a check-bit line C0. The reason why the group D of the data-bit lines includes four bits in the direction of the column, is that the four bits in the column direction are convenient for data recording. Of course, the number of the bits included in the group of the data-bit lines is not limited to four and it may be suitably selected according to a data writing mode employed. The check bit C0 is set, for example, in the form of parity bit. Of course, two or more check-bit lines may alternatively be provided according to necessity.

The blocks B0 to Bn each have, at the respective starting ends thereof in the longitudinal direction, a block number portion R1 which corresponds to a track number in the conventional recording format. The block number portion R1 is formed, for example, of three bits in the longitudinal direction of the data-bit line, so that 4×3 bits (in the group D of the data-bit lines) may be used for the block numbers to allocate numbers of 0000 to 4095 as the block numbers.

Each of the blocks B0 to Bn has, at a portion after the block number portion R1, a plurality of sectors S0, S1, . . . . The boundary portions R5 are provided between the respective sectors S0, S1 . . . . For example, a specific optical pattern (square in the present embodiment) are provided at each of the boundary portions R5 over a column of the group of the data-bit lines D0 to D3 and a column of the check-bit line. This pattern is provided in the form of an optical state similar to the data writing. The pattern is formed so as to have a high reflectivity in the present embodiment, which corresponds to a high-level state of the data. Therefore, the boundary portion R5 may be read as "1, 1, 1, 1, 1" when it is read in the column direction. Of course, the boundary portion R5 may alternatively be formed as "0, 0, 0, 0, 0."

Each sector S0, S1 includes a sector number portion R2, a data portion R3 and an error checking portion R4.

The sector number portion R2 is allotted with two bits in the longitudinal direction of the group of the data-bit lines, so that 4×2 bits may be used for providing sector numbers 000 to 255.

Since the data portion R3 has 4096 bits in the longitudinal direction of the data track so that 4×4096 bits are allotted in total for the group D of the data-bit lines for allowing data recording of 16K bits. If one letter of the data is expressed by four bits, then the data of 4096 letters can be written.

The error checking portion R4 is set to have a length corresponding to four bits in the longitudinal direction of the data track, so that a check code comprising four bits may be written in each of the lines. The check code may, for example, be CRC (cyclic redundancy check) or ECC (error correcting code).

The recording format configured as described above will operate in the data reading or writing as follows:

Prior to the data reading or writing operation, the block numbers and the sector numbers of the respective blocks are written. At the same time, the check bits C0 corresponding to the block number portions R1 and the sector number portions R2 are written one by one so as to make the parity same.

For the writing of the data, a block, in which the data is to be written, is sought through the block number and the sector, in which the data is to be written, is sought through the sector number. The data is written in the column direction of the data-bit group D of the data portion R3 by four bits. The amount of the data to be written upon one access is increased as compared with the conventional format having a width of one bit, because the present embodiment has a width of four bits.

The writing of the data is effected by forming optically differing states (for example, different reflectivities). The states correspond to "1" and "0", respectively. In the present embodiment, a state of high reflectivity corresponds to "1" and a state of low reflectivity corresponds to "0".

During the data writing operation, the check bits C0 corresponding to the block number portion R1 and the sector number portion R2 are written one bit by one bit according to necessity, to make the parity same. Error checking codes are written in the error checking bit portion R4 so as to correspond to the data-bit lines D0 to Dn of the data-bit group D.

After the data writing of one sector has been completed, another sector will be written in sequentially.

When the data writing throughout the block has been completed, then another block will be written in.

On the other hand, for reading of the data, the block number is read to find a block to be read and the sector number is read to find a sector to be read. In the reading of the block number and the sector number, the checking bits C0 are also read together to check whether the numbers read is correct or not.

Upon finding of the block and sector to be read, the data is read by four bits from the data-bit array D of the data-bit lines D0 to Dn of the data portion R3. The data reading is carried out by reading the optically differring states (for example, different reflectivities) as "1" or "0" of the data. In the present embodiment, the high-reflective state corresponds to "1" and the low-reflective state corresponds to "0".

In the data reading operation, the checking bits C0 corresponding to the block number portion R1 and the sector number portion R2 are read simultaneously. This allows parity check to determine whether the four-bit data has been accurately read or not. In addition, the error checking codes, which are written in the respective data-bit lines D0 to Dn of the data-bit array D in the error check bit portion R4, are read and the data already read are arranged so as to correspond to the respective lines D0 to Dn of the data-bit array D to check an error.

Thus, after the data of one sector has been read, another sector will be subjected to reading sequentially. When the reading of the data has been completed throughout the block, then the reading operation will be carried out in the next block.

Second Embodiment

Figure 3:
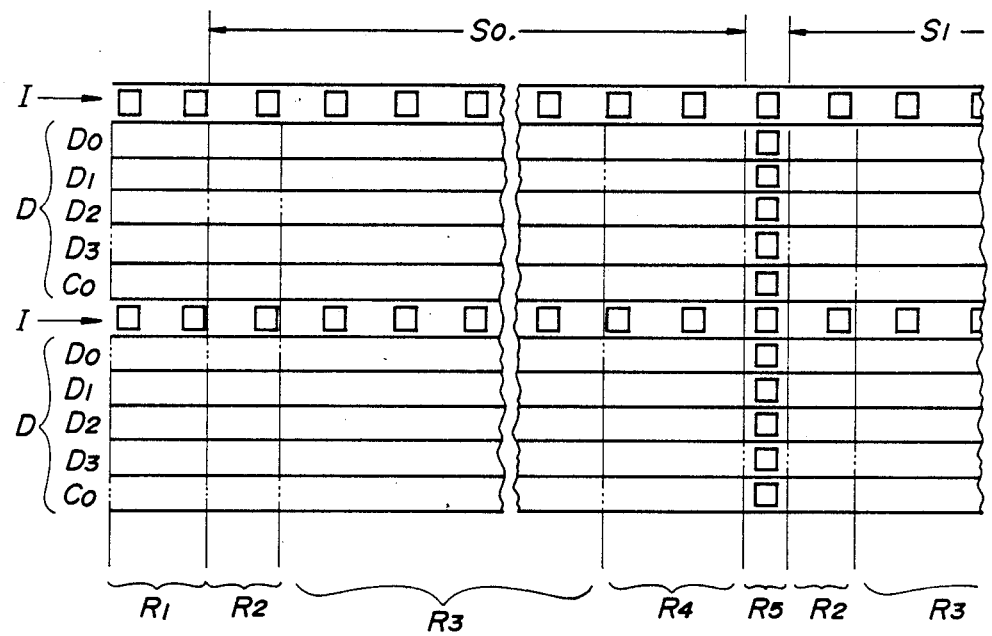
FIG. 3 is an explanatory view showing a configuration of a recording format for an optical recording medium according to a second embodiment of the present invention.

FIG. 3 illustrates a configuration of a second embodiment of the present invention. In this embodiment, a boundary information line I having a width of one bit is provided to partition the data recording region 2 into blocks. The configuration of this embodiment is substantially the same as that of the first embodiment except for the boundary information line I. Only the difference will now be described.

The boundary information line I is provided along a longitudinal side of each of the blocks and has a specific code pattern distinguishable from the remaining portions. The code pattern is similar to that used for the partitions between the sectors and provided every other bit on one data-bit line.

Since the boundary information line I partitions the blocks, the access to a target block can be made by counting the boundary information lines I from one side of the data recording region, without reading and collating the block numbers.

In the present embodiment, each block is interposed between the code patterns of (1, 0) as illustrated in FIG. 3.

This arrangement of code patterns may be employed to effect tracking error checking. In this case, the code patterns of the boundary information lines, between which each block is interposed, are detected by at least two photodetectors arranged in a line along the width of the block and spaced at a pitch of the boundary information lines.

More specifically, when the line, on which the photodetectors are arranged, intersects accurately at a right angle with the block, the two photodetectors detect the same code patterns, like (1, 1) or (0, 0) according to the code patterns of the boundary information lines. On the other hand, when the line, on which the photodetectors are arranged, does not intersect at a right angle with the block and skews with respect to the block, the photodetectors detect different code patterns, respectively, like (1, 0) or (0, 1). Therefore, the outputs from the respective photodetectors may be compared to effect the tracking error checking easily.

The code pattern used in the present embodiment is substantially as (1, 0), another code pattern may be employable so long as it can function similarly. For example, the boundary information line may have a width of two bits, so that the code pattern may be formed by arranging 0, 1 in matrix.

Third Embodiment

Figure 4:
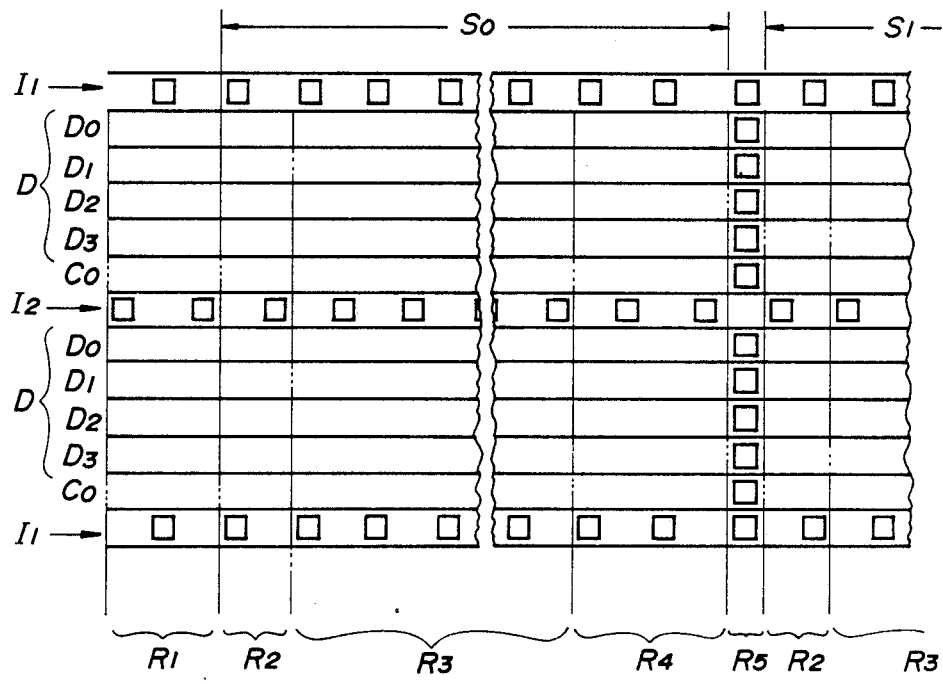
FIG. 4 is an explanatory view showing a configuration of a recording format for an optical recording medium according to a third embodiment of the present invention.

FIG. 4 illustrates a configuration of a third embodiment of the present invention. In this embodiment, a boundary information line I having a width of one bit is provided to partition the data recording region 2 into blocks. The configuration of this embodiment is substantially the same as that of the second embodiment except for the configuration of the boundary information line I. Only the difference will now be described.

The boundary information line I has a code pattern $I_1$ which repeats (0, 1) or a code pattern $I_2$ which repeats (1, 0). In the present embodiment, the code patterns $I_1$ and $I_2$ are disposed alternatingly. Thus, each of the blocks are interposed between the boundary information lines of different code patterns $I_1$ and $I_2$. More specifically, the block which is interposed between $I_1$ (upper) and $I_2$ (lower) and the block which is interposed between $I_2$ (upper) and $I_1$ (lower) are juxtaposed alternatingly. As a result of this, each column of the data bits in the width direction of the respective block is interposed between different code patterns, such as (1, 0) and (0, 1) as illustrated in FIG. 4.

In the present embodiment, the arrangement of the code patterns as described above may also be utilized for tracking error check as in the second embodiment.

More specifically, when the line formed by the photodetectors and the block intersect properly or accurately, the photodetectors detect the different code patterns like (0, 1) and (1, 0). On the other hand, if the line of the photodetectors is skew with respect to the block, the same code pattern like (1, 1) or (0, 0) is detected. Thus, the tracking error checking can be effected easily through the comparison of the outputs from the photodetectors disposed corresponding to the boundary information lines.

Modified Embodiments

The boundary portions R5 between the respective sectors S0, S1 . . . are provided in the form of square optical patterns in the foregoing embodiment, but the patterns are not limited to square ones and they may alternatively be circular or rectangular patterns. Similarly, the data may be formed in other patterns, as described above.

Also, the code pattern of the boundary information line I are formed by square optical patterns as of the boundary portion in the second and third embodiments, but the optical pattern is not limited to square and it may alternatively be, for example, circular or rectangular.

In the foregoing embodiments, the optical patterns of the boundary portions and the boundary information lines are formed in optical states similar to those of the data writing. More specifically, the patterns are binary-encodedly formed in terms of high and low reflectivities. As a result of this, the optical patterns correspond to "1" and "0" of the data. However, the present invention is not limited to this configuration, but the following configuration may also be employed.

The data recording region may be set at an intermediate reflectivity. The optical patterns of the boundary portions and the boundary information lines may be binary-encodedly formed in terms of intermediate reflectivity and a higher reflectivity. On the other hand, the data is binary-encodedly expressed in terms of intermediate reflectivity and a lower reflectivity. In this case, the state of lower reflectivity represents "1". This configuration is especially suitable when the optical patterns of the boundary portions and the boundary information lines are pre-recorded in the manufacturing process of the optical recording media and the data is written afterwards by users of the optical recording media.

Alternatively, the data recording region may be set at the lowest reflectivity and the optical patterns of the data and the boundary information lines may be binary-encodedly formed in terms of two states of refectivity higher than said lowest reflectivity. In this case, the surface of the data recording region may be used, as it is, without further processing, for the boundary portions. The reflectivity of the surface of the data recording region may be set at the lowest reflectivity, so that the boundary portions may appear as if they are gaps.

Or, the data recording region may be set at the lowest reflectivity and the optical patterns of the data may be binary-encodedly formed in terms of two states of refectivity higher than said lowest reflectivity. In this case, the surface of the data recording region may be used, as it is, without being further processed, for the boundary information lines and the boundary portions. The reflectivity of the surface of the data recording region may be set at the lowest reflectivity, so that the boundary information lines and the boundary portions may appear as if they are gaps.

Although one line of the data-bit lines constituting each block is used as a check-bit line in the foregoing embodiment, the check-bit line may be omitted so that all the data-bit lines may be used for writing data to increase the data storage density.

Or, the sectors provided in each of the foregoing embodiments may be omitted according to the application, for which the optical recording medium is used.

I claim:

1. A recording format for a rectangular optical recording medium in the form of a card having a rectangular data recording region with a longitudinal dimension and a transverse dimension, said recording region comprising a rectangular array of a plurality of longitudinal bit lines and transverse columns, wherein:

the data recording region is divided into a plurality of longitudinal bands to form blocks each having a width corresponding to a desired number of bit lines;

each of the blocks is allotted a respective identifier to enable access by block unit;

each block comprises a plurality of longitudinal data bit lines and at least one longitudinal check bit line, data in said data bit lines block being arranged in columns transverse to the longitudinal direction of said block;

longitudinal boundary information lines, each having a specific code pattern, are provided between adjacent blocks to section the data recording region into the blocks;

each block is divided in the longitudinal direction into a plurality of sectors by at least one sector boundary portion; and each sector includes at least one error check column in the transverse direction comprising a bit from each bit line.

2. A recording format as claimed in claim 1, wherein successive longitudinal boundary information lines have respective code patterns of alternating bit values (0,1) and complementary alternating bit values (1,0), said patterns repeating uniformly throughout the recording region.

3. A recording format as claimed in claim 1, wherein said sector boundary portion having a specific optical pattern is provided between two adjacent sectors, and each sector includes a sector identifier to enable access by sector.

4. A recording format as claimed in claim 2, wherein said sector boundary portion having a specific optical pattern is provided between two adjacent sectors, and each sector includes a sector identifier to enable access by sector.

* * * * *